(12) United States Patent
Ahamed

(10) Patent No.: US 11,068,385 B2
(45) Date of Patent: Jul. 20, 2021

(54) BEHAVIOR DRIVEN DEVELOPMENT TEST FRAMEWORK FOR APPLICATION PROGRAMMING INTERFACES AND WEBSERVICES

(71) Applicant: JPMORGAN CHASE BANK, N.A., New York, NY (US)

(72) Inventor: Laiq Ahamed, Hyderabad (IN)

(73) Assignee: JPMORGAN CHASE BANK, N.A., New York, NY (US)

(*) Notice: Subject to any disclaimer, the term of this patent is extended or adjusted under 35 U.S.C. 154(b) by 33 days.

(21) Appl. No.: 16/712,586

(22) Filed: Dec. 12, 2019

(65) Prior Publication Data

US 2020/0233793 A1 Jul. 23, 2020

Related U.S. Application Data

(60) Provisional application No. 62/793,464, filed on Jan. 17, 2019.

(51) Int. Cl.
*G06F 11/36* (2006.01)
*G06N 20/00* (2019.01)
*G06F 9/54* (2006.01)

(52) U.S. Cl.
CPC ......... *G06F 11/3688* (2013.01); *G06F 9/54* (2013.01); *G06N 20/00* (2019.01)

(58) Field of Classification Search
USPC ....................................................... 717/124
See application file for complete search history.

(56) References Cited

U.S. PATENT DOCUMENTS

| | | | |
|---|---|---|---|
| 2013/0152047 A1* | 6/2013 | Moorthi | G06F 11/368 717/124 |
| 2016/0283353 A1* | 9/2016 | Owen | G06F 11/3692 |
| 2016/0321165 A1* | 11/2016 | Totale | G06F 11/3688 |
| 2018/0121336 A1* | 5/2018 | Ayyappan | G06F 11/3672 |
| 2018/0196731 A1* | 7/2018 | Moorthi | G06F 11/3664 |
| 2018/0217920 A1* | 8/2018 | Bhojan | G06F 11/3688 |
| 2018/0232299 A1* | 8/2018 | Shani | G06F 11/3692 |
| 2018/0267888 A1* | 9/2018 | Shani | G06F 8/71 |

* cited by examiner

*Primary Examiner* — John Q Chavis
(74) *Attorney, Agent, or Firm* — Greenberg Traurig LLP

(57) ABSTRACT

Systems and methods for testing software such as webservices and APIs using behavior-driven development (BDD) language are disclosed. Software such as, for example, an Application Programming Interface (API) or webserver is tested using a BDD expression such as, for example, a Gherkin. The Gherkin may be converted into machine-executable code for the test. The machine-executable code may be executed if the software is available. A response output generated by the software may be validated based on validation information of input data. A report based on the validation may be generated.

20 Claims, 3 Drawing Sheets

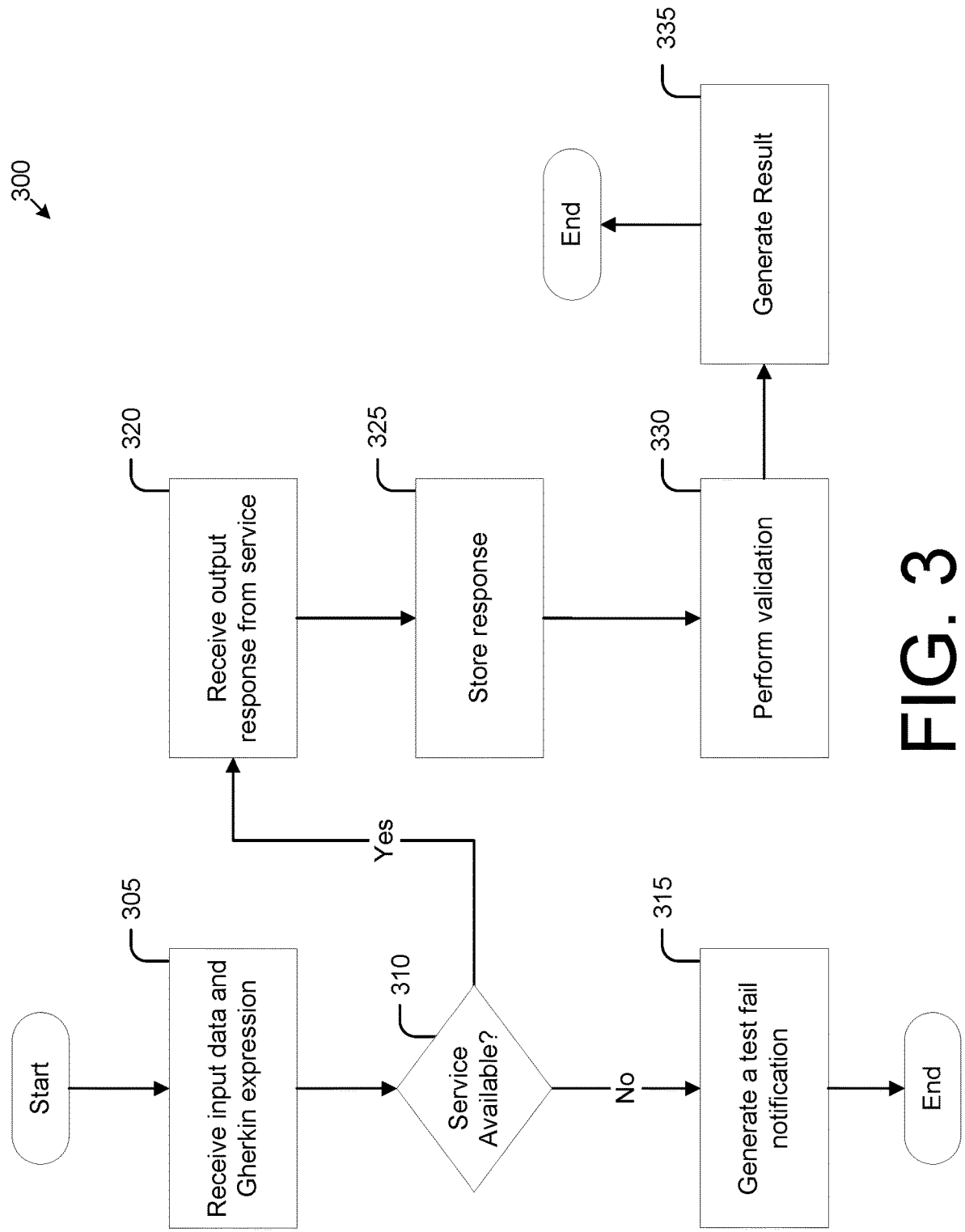

BEHAVIOR DRIVEN DEVELOPMENT TEST FRAMEWORK FOR APPLICATION PROGRAMMING INTERFACES AND WEBSERVICES

RELATED APPLICATIONS

This application claims priority to, and the benefit of, U.S. Provisional Patent Application Ser. No. 62/793,464, filed Jan. 17, 2019, the disclosure of which is hereby incorporated, by reference, in its entirety.

BACKGROUND OF THE INVENTION

1. Field of the Invention

Embodiments relate to systems and methods to test Application Programming Interfaces (APIs) and/or webservices using a behavior-driven development (BDD) language such as, for example, the Gherkin language.

2. Description of the Related Art

An API or webservice may be tested as a part of software development. Testing may be done, for example, to check whether the API or webservice functions as intended, such as whether it returns a correct output or performs an expected action in response to a particular input.

API testing may be highly technical. Because the API may lack a graphical user interface, or other form of direct user interface, API testing may require software coding. Further, different tests may be needed for each individual API or webservice, for example SOAP, REST, etc. Due to the complexity and the ad hoc nature of the tests, API testing may often be performed by quality engineers. Business and functional users who need to use the API in practice, on the other hand, may not be able to test the APIs, or will be limited in the scope of their testing, due to lack of technical expertise or due to lack of knowledge about the underlying code base.

SUMMARY OF THE INVENTION

Systems and methods for testing software such as webservices and APIs using behavior-driven development (BDD) language are disclosed. Software testing may involve receiving a Gherkin comprising an identification of a software to be tested and a plain English description of a test to be executed by the software. The at least one processor may receive input data and the input data may comprise validation information for the software. A processor may convert the Gherkin into machine-executable code for the test. The processor may test whether a component of the software is available. The processor may execute the machine-executable code if the software is available. The processor may receive a response output from the software. Then, the processor may validate the response output based on the validation information of the input data. A report may be generated based on the validation.

In some embodiments, the input data comprises an input file. The software component may include an Application Programming Interface (API). The software may be a webservice. A webservice may be, for example, an account creation service, an account query service, or other server-side application that may be invoked by a client device or other service.

In some embodiments, the input data is submitted to the API in response to the software being available. The response output may be generated by the API.

In some embodiments, the Gherkin comprises a uniform resource locator for the software and further comprises a payload of the one or more input files. The payload may comprise data from an XML file. The Gherkin may also reference a service level agreement.

In some embodiments, the Gherkin and the input data are received in response to initiating an automation server. The automation server may comprise a Jenkins server.

In some embodiments, converting the Gherkin into machine-executable code for the test is performed by interpreting the Gherkin utilizing machine learning.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

FIG. 3 is a flowchart illustrating an example of the testing service in a networked environment 100 of FIG. 1 according to various embodiments.

DETAILED DESCRIPTION OF PREFERRED EMBODIMENTS

Exemplary embodiments will now be described in order to illustrate various features. The embodiments described herein are not intended to be limiting as to the scope, but rather are intended to provide examples of the components, use, and operation of the invention.

Figure 1:
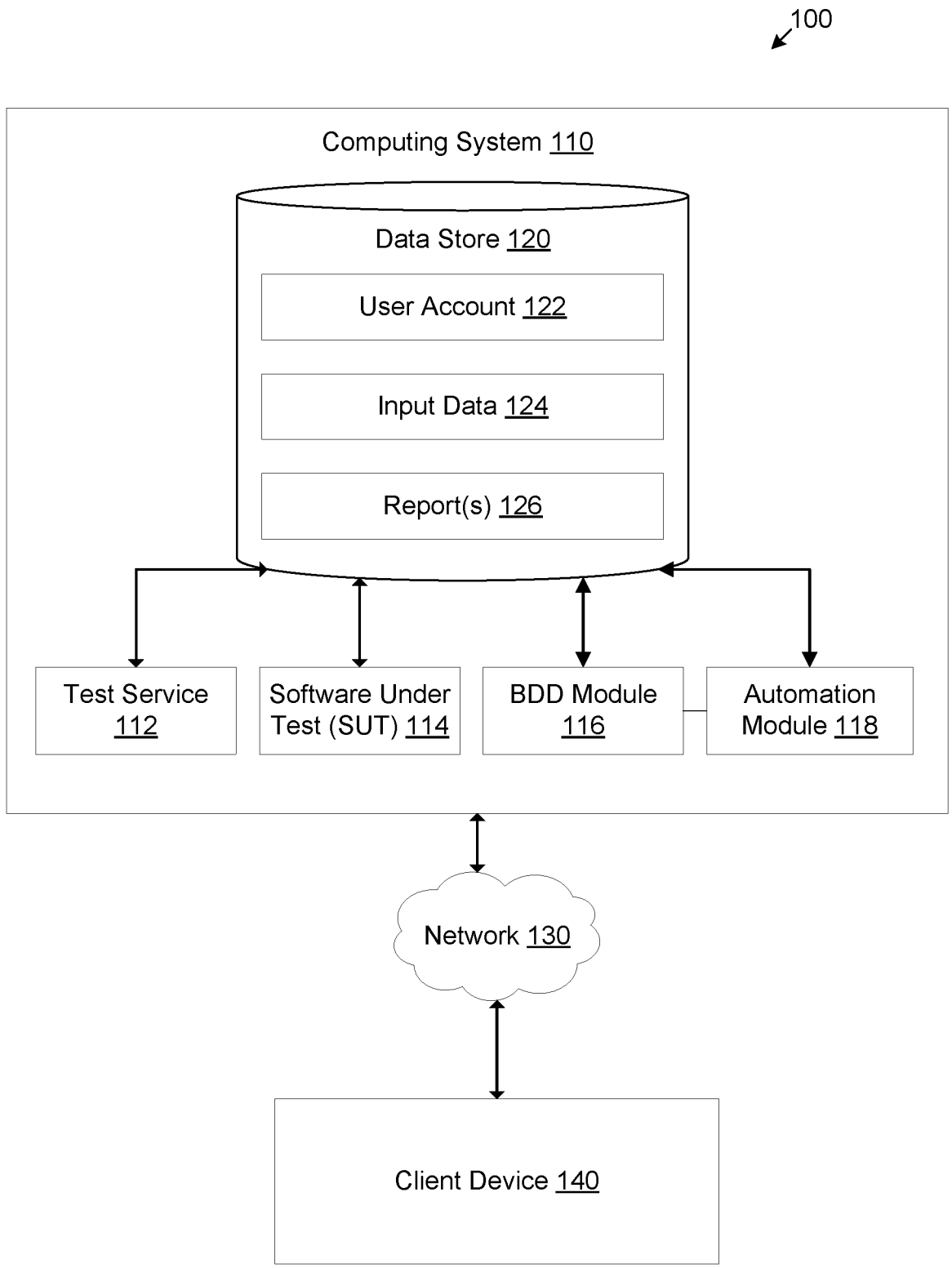
FIG. 1 is a drawing of a networked environment 100 according to various embodiment.

FIG. 1 shows a networked environment 100 according to various embodiments. The networked environment 100 includes a computing system 110 that is made up of a combination of hardware and software. The computing system 110 includes several software programs that may execute in the computing system 110 such as, for example, a test service 112, a software under test (SUT) 114, a BDD module 116, and an automation module 118. The computing system 110 may also include a data store 120. The computing system 110 may be connected to a network 130 such as the Internet, intranets, extranets, wide area networks (WANs), local area networks (LANs), wired networks, wireless networks, or other suitable networks, etc., or any combination of two or more such networks.

The computing system 110 may comprise, for example, a server computer or any other system providing computing capability. Alternatively, the computing system 110 may employ a plurality of computing devices that may be arranged, for example, in one or more server banks or computer banks or other arrangements. Such computing devices may be located in a single installation or may be distributed among many different geographical locations. For example, the computing system 110 may include a plurality of computing devices that together may comprise a hosted computing resource, a grid computing resource and/or any other distributed computing arrangement. In some embodiments, the computing system 110 may correspond to an elastic computing resource where the allotted capacity of processing, network, storage, or other computing-related resources may vary over time. The computing system 110 may implement one or more virtual machines that use the resources of the computing system 110. Various software components may be executed on one or more virtual machines.

Various applications and/or other functionality may be executed in the computing system 110 according to various embodiments. Also, various data is stored in the data store 120 or other memory that is accessible to the computing system 110. The data store 120 may represent one or more data stores 120. The data store 120 may be a database. Data stored in the data store 120 includes, for example, user accounts 122, input data 124, reports 126, and potentially other data. A user account 122 includes information to identify a user such as a user identifier (ID), username, user credentials, user history, and other data that is specific to a user.

The input data 124 may include, for example, the input for software to be tested, a file containing configuration information for an API test, a file containing formatting for the output of the API test, and/or a file containing validation information for the API test.

In one embodiment, the input data 124 may include, for example, a user name, a password, a query input, a json input, and/or an xml input.

In one embodiment, the file containing the configuration information for an API test may include, for example, endpoint data, user credentials for database and service authentication, and/or response time.

In one embodiment, the file containing the validation information for an API test may include, for example, expected values for the output of the API test and expected output from a database response.

In one embodiment, all input data 124 is in the same file, which may be an xml file, a spreadsheet, a text file, or any other file format as desired.

A report 126 is an output file as a result of testing a SUT 114. The report may contain, for example, information about whether an API was available and whether the API output passed a validation process in whole or in part.

As mentioned above, the components executed in the computing system 110 may include a test service 112, a SUT 114, a BDD module 116, and an automation module 118, each of which may access the contents of the data store 120 or generate content to be stored in the data store 120. The test service 112 may implemented as a test framework core that includes functionality to receive inputs related to testing software and generate outputs relating to validation or testing results. The test service 112 may be implemented as a cloud-based service that uses a portal to allow users to initiate software testing.

The software under test (SUT) 114 may be a webservice or an API. The SUT 114 refers to software that is to be tested or software that is being tested according to embodiments. The SUT 114 may reside on a server separate from the test service 112.

In some embodiments, the SUT 114 comprises a message queue that stores messages generated from an application. The messages stored in the message queue may be fixed length messages. When validating a message queue, according to embodiments, the contents of one or more messages in the message queue may be validated based on a BBD script that includes expected content of a message. For example, when validating a message, an offset may be used to test and validate specific portions or stings within a message in the message queue. The offset may identify the location of a variable or character string within a message to validate.

The test service 112 may use a BDD module or otherwise incorporate a BDD module 116. The BDD module 116 may be, for example, a Gherkin module. In this embodiment, the Gherkin module is configured to compile or otherwise process Gherkin-based scripts. "Gherkin" or "Gherkin syntax" as used herein refers to a language that a BDD framework may use to define test cases. It describes use cases relating to a software system and may be non-technical and human readable.

According to embodiments, a Gherkin's syntax may promote behavior-driven development practices across an entire development team, including business analysts and managers helping a SUT 114 (e.g., an API or webservice) to be tested and the test to be performed.

"A Gherkin" as used herein refers to a file or parcel of text using the Gherkin language. The BDD module 116 may interpret a Gherkin along with other input data 124 to generate and execute test code for the API according to the Gherkin or other BDD language.

For example, if a business user wanted to validate a SUT 114 such as webservice 14 named "HelloWorld," an exemplary Gherkin that is used may be a text file with the following text:

---

Scenario: Verify HelloWorld operation.
Given HelloWorld service [URL]
And HelloWorld endpoint is live
When user hits service with a valid [payload]
Then response should return in [defined SLA]

---

The [URL] above may be a uniform resource locator for the "HelloWorld" service. The [payload] above may be an xml file part of the input data 124 that contains an input for the "HelloWorld" service. The [defined SLA] above may be a service level agreement and may be specified by the user. The service level agreement information may be in a configuration file. The service level agreement information may specify a response time returned from a webservice or API.

The automation module 118 may comprise a webservice that provides automation for continuous integration of code. In one embodiment, the automation module 118 is implemented using Jenkins, an open source automation server. Testing software may be initiated by the automation module 118. In an alternative embodiment, testing a piece of software (e.g., SUT 114) may be initiated by the user directly rather than by using any intermediary automation service.

The networked environment 100 further includes one or more client devices 140. A client device 140 allows a user to interact with the components of the computing system 110 over the network 130. A client device 140 may be, for example, a cell phone, laptop, personal computer, mobile device, or any other computing device used by a user. The client device 140 may include an application such as a web browser or dedicated application that communicates with the test service 112 to access information and submit requests for testing a SUT 114.

Figure 2:
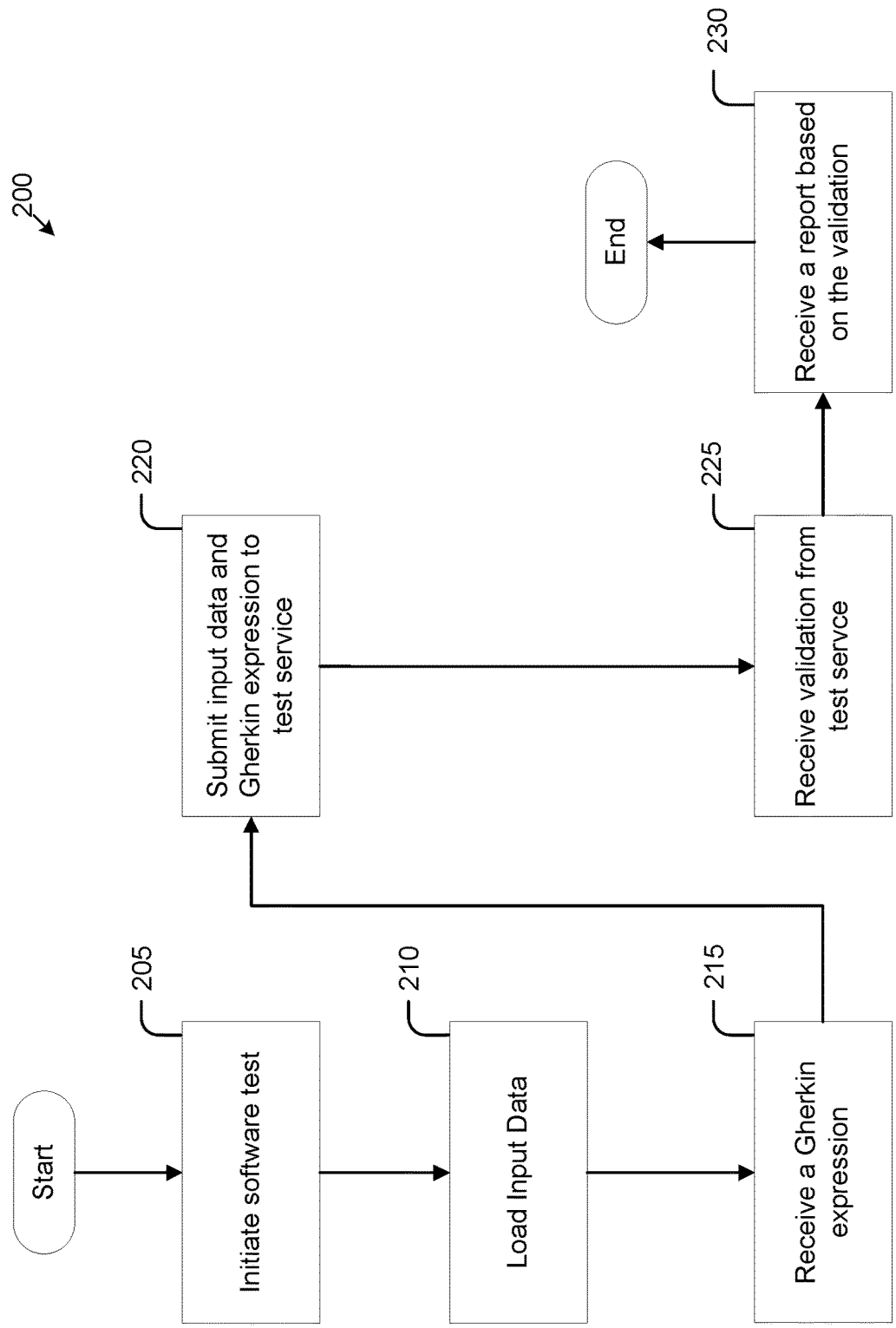
FIG. 2 is a flowchart illustrating an example of the functionality to automate testing in a networked environment 100 of FIG. 1 according to various embodiments.

Examples of functionality that may be implemented by the components in the networked environment 100 are described in greater detail with respect to FIGS. 2 and 3.

FIG. 2 is a flowchart illustrating an example of the functionality to automate testing in a networked environment 100 of FIG. 1 according to various embodiments. It is understood that the flowchart of FIG. 2 provides an illustrative example of the many different types of functional arrangements that may be employed to implement the operation of the portion of the computing system 110 as described herein. The flowchart of FIG. 2 may also be viewed as depicting an example of a method 200 implemented in the networked environment 100 of FIG. 1 according to one or more embodiments.

At item 205, the system may initiate a software test such as, for example, a test performed on the SUT. For example, the automation module may be configured to identify the SUT for testing using the test service. In an alternative embodiment, the test may be initiated by the user directly rather than by using any intermediary automation service. For example, the user may initiate software testing by selecting a SUT. The user may use a client device to access the test service over the network to initiate a software test.

In some embodiments, the automation module 118 may interface with a scheduler. A scheduler may be a separate program or it may be embedded into the automation module 118. The automation module 118 may use the scheduler to schedule a testing of the SUT on a scheduled basis. In an alternative embodiment, the automation module 118 may initiate a testing of software immediately rather than on a schedule.

At item 210, the input data 124 may be loaded into the test service 112. The input data 124 may be formatted as one or more input files. The input data may be loaded by the automation module 118 or by a user using a user interface on a client device 140. For example, the test service 112 may include a portal that is accessible using a client device 140. Through the portal, a user may define input data 124 and submit it for storage in a data store 120. Through the portal, a user may invoke the test service 112. The input data 124 may specify the SUT 114 by including, for example, a location of the SUT 114.

At item 215, the system may receive a Gherkin expression or another BDD language expression. The Gherkin expression is intended to test the SUT 114. A Gherkin comprising a Gherkin expression may also include an identification of the SUT 114. The Gherkin may also comprise a plain English description of a test to be executed on the SUT 114.

At item 220, the Gherkin expression or other BDD expression may be provided to the test service 112 along with the input data 124. For example, the input data 124 may be combined with a Gherkin expression before being input to the test service 112.

The test service 112 may interpret the Gherkin into machine-executable test instructions for an API test, then execute the API test instructions with the input data 124. The test service 112 may, for example, check the availability of the API. If the API is available, the test framework core may submit the input data to the API and record the API's output response. The test service 112 may interact with the API as though it were a regular user. For example, if the SUT 114 provides a webservice or API to open up a user account, the test service 112 may submit user credentials or attempt to open a new account with a username and password.

In one embodiment, the test service 112 may interact with an API or webservice according to settings in a configuration information file of the input data 124.

In one embodiment, the test service 112 may interpret the Gherkin by searching for fixed keywords and operators. In another embodiment, the test service 112 may interpret the Gherkin by utilizing machine learning, for example natural language processing.

In one embodiment, the test service 112 may format the API output according to an output formatting file specified by the input data 124.

The test service 112 may also communicate with a data store 120. The response retrieved from the data store 120 may be in the form of a result set, which may be induced to different data structures as required. A connection to a data store 120 may be made when there is a successful response from the API to validate.

The test service 112 may validate the output of the API. The test service 112 may, for example, compare the output of the API with expected data from the validation information specified by the input data 124.

At item 235, the system may receive a validation from the test service 112.

At item 230, the system may receive a report 126 based on the validation. The report 126 may be stored in the data store 120 and/or transmitted to a client device 140 over the network 130. The test service 112 may generate a report based on the validation operation. The report 126 may contain, for example, information about whether an API was available and whether the API output passed validation in whole or in part.

FIG. 3 is a flowchart illustrating an example of the testing service in a networked environment 100 of FIG. 1 according to various embodiments. It is understood that the flowchart of FIG. 3 provides an illustrative example of the many different types of functional arrangements that may be employed to implement the operation of the portion of the test service 112 as described herein. The flowchart of FIG. 3 may also be viewed as depicting an example of a method 300 implemented in the networked environment 100 of FIG. 1 according to one or more embodiments. For example, the method 300 may be implemented by the test service 112.

At item 305, the test service may receive input data and a Gherkin expression. A user may generate input data for use with the test service. The user may draft one or more Gherkins to be combined with the input data 124 and submit it into the test service 112. The test service 112 may then interpret the one or more Gherkins into a machine-executable test and build instructions to be executed with the input data 124.

The test system 112 may receive a Gherkin comprising an identification of a SUT 114 (e.g., API or webservice and a plain English description of a test to be executed on the SUT 114.

At item 310, the test service 112 may check the availability of the SUT 114 or a component/service of the SUT 114. At item 315, if the SUT is not available, the test may fail, and the test service may generate a report 116, which indicates the failure.

At item 320, if the SUT 114 is available, the test service 112 may obtain a response output from the SUT 114. The test service 112 may also receive a response from a data store 120 in connection with an API or webservice of the SUT 114.

At item 325 the test service 112 may store the response output in the data store 120. The response output may be included in a report 126.

At item 330, the test service 112 may validate the response output from the SUT 114. In one embodiment, the test service 112 may also validate the response from the data store 120.

In step 335, the validation results may be used to generate a report 116. The test service 112 may store the report 126 in the data store 120. The report may be made accessible to a client device 140 over the network 130 using, for example, a portal.

To illustrate some embodiments of the present disclosure, the following example is provided. In this example, a BDD script, such as for example, a Gherkin script, may be received by the computing system 110 or otherwise stored in the data store 120 as one or more files:

---

Verify "API /web service Name" operation for TESTCASE: <TestCase>
Given "<TestCase>" data provided in excel
And webservice endpoint is live
   When prepare soap request by replacing request parameters for <TestCase>
      And user hits soap service with a valid payload
      Then soap/rest response should be successful
      And validate below response fields against database for each of the transactions
         |Account Holder Name     | xyz    |
         |Account holder country     | USA    |

---

The Gherkin above includes a scenario presented in a plain English description of a test to be executed on an API or webservice. In this example, the Gherkin is based on a scenario to validate an operation for obtaining account details of an account holder.

Additionally, in this example, the Gherkin may include a command to "verify" an operation for a particular SUT 114 by referencing the name of the SUT 114 (e.g., API/web service Name). The Gherkin may identify a test case subject to the operation. The Gherkin may include various preconditions or states for the validation scenario. For example, the precondition or state may specify details for the test case used in the validation scenario. These details may be formatted as a file such as, for example, an Excel file. Another example of a precondition or state may be that the SUT 114 is a live endpoint.

The validation scenario of a Gherkin may also specify an action performed by the system or user. For example, the action in the validation scenario may be preparing a request by replacing request parameters for a test case. The action may also be receipt of a valid payload.

The Gherkin may also include an outcome that is to be detected. For example, the Gherkin may include a statement that a particular response is successful.

In some embodiments, the Gherkin includes one or more response fields to be validated against a database. In the example above, the Gherkin may validate that a particular response generates a specified account holder name and account holder country. In other words, the Gherkin comprises validation information in the form of an expected result. The expected result may be formatted as one or more fields of a database. The values of the validation information may be accessed during run time of the Gherkin. In other embodiments, the validation information may be provided in a separate file that is referenced in the Gherkin. The separate file may be provided as input data 124.

In some embodiments, the input data 124 may be stored in an input folder, the input folder comprising the Gherkin. The input data 124 may include input properties. Input properties may include an identification of the data store 120, the identification of one or more databases within the data store 120, data relating to connecting to one or more database, and data relating to other connected components that are part of the validation.

The input data 124 may include one or more excel files or database files that contain information for each unique test. For example, the excel file or database file may include a field for whether a particular test was run, the name of a test case, a test case ID, a description of the test case, one or more input queries for a test case, one or more validation queries, one or more expected messages from running a query, and other fields relating to a particular test. The excel file or database file may be structured so that each row is dedicated to a different test. The Gherkin may reference a specific test within the excel file or database file.

The input data 124 may further include a SUT input that is submitted to the SUT 114. The SUT input may be an XML file or json file. The SUT input may be provided to the SUT 114 as part of the validation to determine if a generated output matches an expected output as specified by the Gherkin.

When the Gherkin and input data 124 are received, the Gherkin is processed into machine-executable code. For example, a BDD module 118 may parse the Gherkin into steps and then identify corresponding glue code for each Gherkin step. A regex (regular expression) pattern may be used to identify the appropriate glue code for each step in a Gherkin. For example, a pattern matching program may be used to determine the most appropriate glue code for each Gherkin step. The BDD module 118 may use supervised or unsupervised machine learning to cluster sample Gherkin steps and then classify like Gherkin steps into a corresponding glue code. The BDD module 118 may receive training data to improve its classifier. The BDD module 118 may use the glue code to generate machine-executable code for the Gherkin.

Upon executing the machine-executable code for the Gherkin, a validation is performed according to the input data 124. The validation may result in the generation of a log file that is stored in the data store 120. The log file may comprise a series of transactions relating to inputting data into the SUT 114. A transaction captured in the log file may involve an individual database access. The log file may also include an indication of whether an actual output matched an expected output specified by the Gherkin. The log file may indicate whether a validation passed or failed.

A report 126 may be generated based on one or more log files. For example, a report may aggregate the validation results from a plurality of tests. The report 126 may include statistics related to executing one or more Gherkins or executing a Gherkin with respect to a plurality of test cases or data inputs.

Those of ordinary skill in the art will appreciate that the various embodiments of the described herein may be readily practiced within a BDD test framework.

Embodiments may provide advantages by separating the inputs and offsets for message queue as well as validation data from the test framework core, allowing the same test framework core to be used with any number of APIs or webservices without requiring new test code. Regarding offsets, a message queue response may be in the form of strings. In order to retrieve information, there may be offsets or position where a specific value is present. Embodiments may provide further advantages by accepting simple English inputs, enabling business and functional users to run API tests without knowledge of the code behind them. Embodiments may provide further advantages by allowing faster development and execution of API tests by eliminating the need to write new code for each test or for each different API or webservice. All testing may be automated once the input data is generated by the user.

Hereinafter, general aspects of implementation of the systems and methods of the embodiments will be described.

The system of the embodiments or portions of the system of the embodiments may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the embodiments.

The processing machine used to implement the embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the methods as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment, be performed by a single component. Further, the processing performed by one distinct component as described above may be performed by two distinct components. In a similar manner, the memory storage performed by two distinct memory portions as described above may, in accordance with a further embodiment, be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, Python, REXX, Visual Basic, and/or JavaScript, for example. Further, it is not necessary that a single type of instruction or single programming language be utilized in conjunction with the operation of the system and method of the embodiments. Rather, any number of different programming languages may be utilized as is necessary and/or desirable.

Also, the instructions and/or data used in the practice of the embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the embodiments.

Further, the memory or memories used in the processing machine that implements the embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the embodiments, a variety of "user interfaces" (e.g., portals) may be utilized to allow a user to interface with the processing machine or machines that are used to implement the embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method of the embodiments may interact partially with another processing machine or processing machines, while also interacting partially with a human user.

It will be readily understood by those persons skilled in the art that the present embodiments are susceptible to broad utility and application. Many embodiments and adaptations other than those herein described, as well as many variations, modifications and equivalent arrangements, will be apparent from or reasonably suggested by the present embodiments and foregoing description thereof, without departing from the substance or scope of the invention.

Accordingly, while the present exemplary embodiments have been described here in detail, it is to be understood that this disclosure is only illustrative and exemplary and is made to provide an enabling disclosure of the invention. Accordingly, the foregoing disclosure is not intended to be construed or to limit the present embodiments or otherwise to exclude any other such embodiments, adaptations, variations, modifications or equivalent arrangements.

What is claimed is:

1. A computer-implemented method for testing an Application Programming Interface (API) or webservice, the method comprising the steps of:
   receiving a Gherkin comprising an identification of an API or webservice and a plain English description of a test to be executed on the API or webservice;
   receiving one or more input files comprising validation information for the API or webservice;
   converting the Gherkin into machine-executable code for the test;
   testing whether the API or webservice is available;
   executing the machine-executable code if the API or webservice is available;
   receiving a response output from the API or webservice;
   validating the response output based on the validation information of the one or more input files; and
   generating a report based on the validation.

2. The method of claim 1, wherein the one or more input files further comprise input data for the API or webservice; and wherein the step of executing the machine executable code further comprises submitting the input data to the API or webservice.

3. The method of claim 1, further comprising:
   submitting the one or more input files to the API in response to the API being available; and
   recording the response output of the API.

4. The method of claim 1, wherein the Gherkin comprises a uniform resource locator for the webservice and further comprises a payload of the one or more input files.

5. The method of claim 1, wherein the payload comprises data from an XML file.

6. The method of claim 1, wherein the Gherkin refers to a service level agreement.

7. The method of claim 1, wherein the Gherkin and the one or more input files are received in response to initiating an automation server.

8. The method of claim 7, wherein the automation server comprises a Jenkins server.

9. The method of claim 1, wherein converting the Gherkin into machine-executable code for the test comprises interpreting the Gherkin by utilizing machine learning.

10. A method for testing software, comprising in an information processing apparatus comprising at least one computer processor:

receiving a behavior-driven development (BDD) expression, the BDD expression comprising an identification of a software to be tested and a plain English description of a test to be executed by the software;

receiving input data comprising validation information for the software;

converting the BDD expression into machine-executable code for the test;

testing whether a component of the software is available;

executing the machine-executable code if the software is available;

receiving a response output from the software;

validating the response output based on the validation information of the input data; and generating a report based on the validation.

11. The method of claim 10, wherein the input data comprises an input file and wherein the component of the software comprises an Application Programming Interface (API).

12. The method of claim 11, further comprising submitting the input data to the API in response to the software being available.

13. The method of claim 11, wherein the response output is generated by the API.

14. The method of claim 10, wherein the BDD expression comprises a uniform resource locator for the software and further comprises a payload of the one or more input files.

15. The method of claim 10, wherein the payload comprises data from an XML file.

16. The method of claim 10, wherein the BDD expression references a service level agreement.

17. The method of claim 10, wherein the BDD expression and the input data are received in response to initiating an automation server.

18. The method of claim 17, wherein the automation server comprises a Jenkins server.

19. The method of claim 1, wherein converting the BDD expression into machine-executable code for the test comprises interpreting a Gherkin expression by utilizing machine learning.

20. The method of claim 1, wherein the software comprises a webservice.

* * * * *